(12) United States Patent
Inoue et al.

(10) Patent No.: US 8,962,751 B2
(45) Date of Patent: Feb. 24, 2015

(54) RELEASE AGENT COMPOSITION

(75) Inventors: Hiroaki Inoue, Tokyo (JP); Shuichiro Sugimoto, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/586,064

(22) Filed: Aug. 15, 2012

(65) Prior Publication Data
US 2012/0309883 A1    Dec. 6, 2012

Related U.S. Application Data

(63) Continuation of application No. PCT/JP2011/052779, filed on Feb. 9, 2011.

(30) Foreign Application Priority Data

Feb. 15, 2010    (JP) ................................. 2010-030189

(51) Int. Cl.
*C08F 2/32*    (2006.01)

(52) U.S. Cl.
USPC ............ 524/755; 524/765; 524/773; 524/801

(58) Field of Classification Search
USPC ................... 524/755, 765, 773, 801
See application file for complete search history.

(56) References Cited

U.S. PATENT DOCUMENTS 5,688,309 A * 11/1997 Shimada et al. ............... 106/2
5,876,617 A * 3/1999 Sato et al. ................. 252/8.62
6,590,035 B2 * 7/2003 Shimada et al. ............. 525/199
7,989,567 B2 * 8/2011 Sugiyama et al. ........... 526/224
2005/0106326 A1  5/2005 Audenaert et al.
2008/0045108 A1  2/2008 Masuda

FOREIGN PATENT DOCUMENTS

| CN | 102197106 A | | 9/2011 |
|---|---|---|---|
| EP | 1298180 A1 | * | 4/2003 |
| EP | 1788047 A1 | * | 5/2007 |
| JP | 2003-12588 | | 1/2003 |
| JP | 2005-54020 | | 3/2005 |
| JP | 2006-37085 | | 2/2006 |
| JP | A-2006-37069 | | 2/2006 |
| JP | 2009-12250 | | 1/2009 |
| JP | 2010-59311 | | 3/2010 |
| WO | WO 2006/101089 | | 9/2006 |
| WO | WO 2009/113589 | | 9/2009 |

OTHER PUBLICATIONS

International Search Report issued May 10, 2011 in PCT/JP2011/052779 (filed Feb. 9, 2011).

* cited by examiner

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

A release agent composition, which includes a fluorocopolymer having structural units based on a monomer (a) having a $C_{1\text{-}6}$ polyfluoroalkyl group and structural units based on monomer (b) having a $C_{18\text{-}30}$ alkyl group, and a medium, where the mass ratio of the structural units based on the monomer (a) to the structural units based on the monomer (b) (the structural units based on the monomer (a)/the structural units based on the monomer (b)) is from 1/1 to 1/10.

14 Claims, No Drawings

RELEASE AGENT COMPOSITION

TECHNICAL FIELD

The present invention relates to a release agent composition and its production process.

BACKGROUND ART

Heretofore, as an article having releasability on its surface, a protective material for an adhesive face of repositional notes, pressure-sensitive adhesive sheets or tapes, a release film, a release paper and the like have been known. As a method of imparting releasability to the surface of an article, a method of treating the surface of an article with e.g. a silicone type or fluorine type release agent composition has been known. However, with respect to a silicone type release agent, a silicone compound forming a release layer is usually easily attached to a substrate, such being problematic when bonding and separation are repeatedly carried out. On the other hand, as a fluorine type release agent, a release agent composition having e.g. a phosphate compound having a polyfluoroalkyl group (hereinafter a polyfluoroalkyl group will be referred to as a $R^f$ group) having at least 8 carbon atoms dissolved or dispersed in a medium has been known. Further, a release agent composition comprising a copolymer of an acrylate having a $C_{5-18}$ alicyclic group and an acrylate having a perfluoroalkyl group having at least 8 carbon atoms has also been known (Patent Document 1).

However, in recent years, EPA (United States Environmental Protection Agency) has pointed out that a compound having a perfluoroalkyl group (hereinafter a perfluoroalkyl group will be referred to as a $R^F$ group) having at least 8 carbon atoms has a high environmental burden, that is, such a compound is decomposed in the environment or in the body, and its decomposition product will accumulate. Accordingly, a release agent composition comprising a fluorocopolymer having structural units based on a monomer having a $R^f$ group having at most 6 carbon atoms and having structural units based on a monomer having a $R^f$ group having at least 8 carbon atoms reduced as far as possible, and which can impart moderate adhesion and releasability, has been desired.

PRIOR ART DOCUMENT

Patent Document

Patent Document 1: JP-A-2006-37069 (Claims)

DISCLOSURE OF INVENTION

Technical Problem

The present invention provides a release agent composition which can impart moderate adhesion and releasability to the surface of an article and which has a low environmental burden, and its production process.

Solution to Problem

The present invention provides a release agent composition and a process for producing a release agent composition as follows.

[1] A release agent composition comprising a fluorocopolymer having structural units based on the following monomer (a) and structural units based on the following monomer (b), and a medium, wherein the mass ratio of the structural units based on the monomer (a) to the structural units based on the monomer (b) (the structural units based on the monomer (a)/the structural units based on the monomer (b)) is from 1/1 to 1/10:

monomer (a): a compound represented by the following formula (1):

wherein Z is a $C_{1-6}$ polyfluoroalkyl group or a group represented by the following formula (2),
Y is a bivalent organic group or a single bond,
n is 1 or 2, and
X is any one of groups represented by the following formulae (3-1) to (3-5) when n is 1, and is any one of groups represented by the following formulae (4-1) to (4-4) when n is 2:

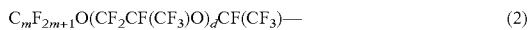

wherein m is an integer of from 1 to 6, and d is an integer of from 1 to 4;

wherein R is a hydrogen atom, a methyl group or a halogen atom, and ϕ is a phenylene group;

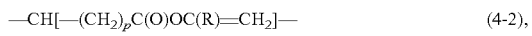

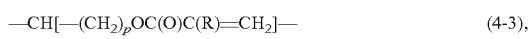

wherein R is a hydrogen atom, a methyl group or a halogen atom, and p is an integer of from 0 to 4;
monomer (b): a (meth)acrylate having no polyfluoroalkyl group and having a $C_{18-30}$ alkyl group.

[2] The release agent composition according to [1], wherein the fluorocopolymer further has structural units based on the following monomer (c):
monomer (c): a halogenated olefin.

[3] The release agent composition according to [1] or [2], wherein the fluorocopolymer further has structural units based on the following monomer (d):
monomer (d): a monomer having no polyfluoroalkyl group and having a crosslinkable functional group.

[4] The release agent composition according to any one of [1] to [3], which further contains a nonionic surfactant and a cationic surfactant.

[5] The release agent composition according to any one of [1] to [4], wherein the medium is at least one aqueous medium selected from the group consisting of water, an alcohol, a glycol, a glycol ether and a glycol ester.

[6] The release agent composition according to any one of [1] to [5], wherein the fluorocopolymer is dispersed as particles in the medium, and the average particle size of the fluorocopolymer is from 10 to 1,000 nm.

[7] A process for producing a release agent composition, which comprises a step of copolymerizing a monomer mixture containing the following monomer (a) and the following monomer (b) in a mass ratio of the monomer (a) to the monomer (b) (the monomer (a)/the monomer (b)) of from 1/1 to 1/10 in the presence of a polymerization initiator:

monomer (a): a compound represented by the following formula (1):

$$(Z-Y)_nX \qquad (1)$$

wherein Z is a $C_{1-6}$ polyfluoroalkyl group or a group represented by the following formula (2), Y is a bivalent organic group or a single bond, n is 1 or 2, and X is any one of groups represented by the following formulae (3-1) to (3-5) when n is 1, and is any one of groups represented by the following formulae (4-1) to (4-4) when n is 2:

$$C_mF_{2m+1}O(CF_2CF(CF_3)O)_dCF(CF_3)- \qquad (2)$$

wherein m is an integer of from 1 to 6, and d is an integer of from 1 to 4;

$$-C(R)=CH_2 \qquad (3-1),$$

$$-C(O)OC(R)=CH_2 \qquad (3-2),$$

$$-OC(O)C(R)=CH_2 \qquad (3-3),$$

$$-OCH_2-\phi-C(R)=CH_2 \qquad (3-4),$$

$$-OCH=CH_2 \qquad (3-5)$$

wherein R is a hydrogen atom, a methyl group or a halogen atom, and $\phi$ is a phenylene group;

$$-CH[-(CH_2)_pC(R)=CH_2]- \qquad (4-1),$$

$$-CH[-(CH_2)_pC(O)OC(R)=CH_2]- \qquad (4-2),$$

$$-CH[-(CH_2)_pOC(O)C(R)=CH_2]- \qquad (4-3),$$

$$-OC(O)CH=CHC(O)O- \qquad (4-4)$$

wherein R is a hydrogen atom, a methyl group or a halogen atom, and p is an integer of from 0 to 4;

monomer (b): a (meth)acrylate having no polyfluoroalkyl group and having a $C_{18-30}$ alkyl group.

Advantageous Effects of Invention

The release agent composition of the present invention can impart moderate adhesion and releasability to the surface of an article, and has a low environmental burden. Further, according to the production process of the present invention, it is possible to produce a release agent composition which can impart moderate adhesion and releasability to the surface of an article and which has a low environmental burden.

DESCRIPTION OF EMBODIMENTS

In this specification, a compound represented by the formula (1) will be referred to as a compound (1). The same applies to compounds represented by other formulae. Further, in this specification, a group represented by the formula (2) will be referred to as a group (2). The same applies to groups represented by other formulae. Further, in this specification, a (meth)acrylate means an acrylate or a methacrylate. Further, in this specification, a $R^f$ group is a group having some or all of hydrogen atoms in an alkyl group substituted by fluorine atoms, and a $R^F$ group is a group having all of hydrogen atoms in an alkyl group substituted by fluorine atoms. Further, in this specification, a monomer means a compound having a polymerizable unsaturated group.

<Release Agent Composition>

The release agent composition of the present invention comprises a fluorocopolymer and a medium as essential components, and contains a surfactant and additives as the case requires.

(Fluorocopolymer)

The fluorocopolymer in the present invention is a fluorocopolymer having structural units based on a monomer (a) and structural units based on a monomer (b) as essential structural units, and as the case requires, has structural units based on monomers (c) to (e).

Monomer (a):

The monomer (a) is a compound (I):

$$(Z-Y)_nX \qquad (1)$$

wherein Z is a $C_{1-6}R^f$ group or the following formula (2):

$$C_mF_{2m+1}O(CF_2CF(CF_3)O)_dCF(CF_3)- \qquad (2)$$

wherein m is an integer of from 1 to 6, and d is an integer of from 1 to 4.

The number of carbon atoms in the $R^f$ group is preferably from 4 to 6. The $R^f$ group may be linear or branched, and is preferably linear.

As Z, the following groups may be mentioned.

$$F(CF_2)_4-$$

$$F(CF_2)_5-$$

$$F(CF_2)_6-$$

$$(CF_3)_2CF(CF_2)_2-$$

Y is a bivalent organic group or a single bond.

The bivalent organic group is preferably an alkylene group. The alkylene group may be linear or branched. The alkylene group may have $-O-$, $-NH-$, $-CO-$, $-SO_2-$, $-CD^1=CD^2-$ (wherein each of $D^1$ and $D^2$ is a hydrogen atom or a methyl group) or the like.

As Y, the following groups may be mentioned.

$$-CH_2-$$

$$-CH_2CH_2-$$

$$-(CH_2)_3-$$

$$-CH_2CH_2CH(CH_3)-$$

$$-CH=CH-CH_2-, \text{ and the like.}$$

n is 1 or 2.

X is any one of groups (3-1) to (3-5) when n is 1, and is any one of groups (4-1) to (4-4) when n is 2:

$$-CR=CH_2 \qquad (3-1),$$

$$-COOCR=CH_2 \qquad (3-2),$$

$$-OCOCR=CH_2 \qquad (3-3),$$

$$-OCH_2-\phi-CR=CH_2 \qquad (3-4),$$

$$-OCH=CH_2 \qquad (3-5)$$

wherein R is a hydrogen atom, a methyl group or a halogen atom, and $\phi$ is a phenylene group;

$$-CH[-(CH_2)_pC(R)=CH_2]- \qquad (4-1),$$

$$-CH[-(CH_2)_pC(O)OC(R)=CH_2]- \qquad (4-2),$$

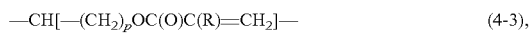

$$-CH[-(CH_2)_pOC(O)C(R)=CH_2]- \quad (4\text{-}3),$$

$$-OC(O)CH=CHC(O)O- \quad (4\text{-}4)$$

wherein R is a hydrogen atom, a methyl group or a halogen atom, and p is an integer of from 0 to 4.

The compound (1) is preferably a (meth)acrylate having a $C_{1-6}R^F$ group, more preferably a methacrylate having a $C_{1-8}R^F$ group, particularly preferably a methacrylate having a $C_{4-6}R^F$ group, in view of the polymerizability with another monomer, the flexibility of a coating film of the fluorocopolymer, the adhesion of the fluorocopolymer to an article, the solubility in the medium, easiness of the emulsion polymerization, and the like.

Monomer (b):

The monomer (b) is a (meth)acrylate having no polyfluoroalkyl group and having a $C_{18-30}$ alkyl group. When the number of carbon atoms in the alkyl group is at least 18, favorable releasability will be obtained. When the number of carbon atoms in the alkyl group is at most 30, the melting point is relatively low, thus leading to easy handling. Specifically, it is preferably stearyl(meth)acrylate or behenyl(meth)acrylate, and in view of excellent mechanical stability of an obtainable release agent composition, it is particularly preferably behenyl acrylate. The monomer (b) may be used alone or in combination of two or more. In a case where stearyl(meth)acrylate and behenyl(meth)acrylate are used in combination as the monomer (b), the content of behenyl(meth)acrylate is preferably at least 5 mass % based on the entire monomer (b).

Monomer (c):

The monomer (c) is a halogenated olefin. By having structural units based on the monomer (c), the strength of a coating film comprising the fluorocopolymer will be improved, and the adhesion between the coating film and an article will be improved.

The halogenated olefin is preferably an olefin chloride or an olefin fluoride, specifically, it may be vinyl chloride, vinylidene chloride, tetrafluoroethylene or vinylidene fluoride. Considering the adhesion between the fluorocopolymer and an article and the coating film strength, it is particularly preferably vinyl chloride or vinylidene chloride.

Monomer (d):

The monomer (d) is a monomer having no $R^f$ group and having a crosslinkable functional group. The crosslinkable functional group is preferably a functional group having at least one bond among a covalent bond, an ionic bond and a hydrogen bond, or a functional group capable of forming a crosslinked structure by an interaction of such a bond. By having structural units based on the monomer (d), the heat resistance or the abrasion resistance of the coating film of the fluorocopolymer will be improved. The number of carbon atoms in the monomer (d) is preferably from 2 to 50, more preferably from 2 to 12.

Such a functional group is preferably an isocyanate group, a blocked isocyanate group, an alkoxysilyl group, an amino group, alkoxymethylamide group, a silanol group, an ammonium group, an amide group, an epoxy group, a hydroxy group, an oxazoline group, a carboxy group, an alkenyl group, a sulfonic acid group or the like. It is particularly preferably an epoxy group, a hydroxy group, a blocked isocyanate group, an alkoxysilyl group, an amino group or a carboxy group.

The monomer (d) is preferably a (meth)acrylate, an acrylamide, a vinyl ether or a vinyl ester.

As the monomer (d), the following compounds may be mentioned.

2-Isocyanatoethyl(meth)acrylate, 3-isocyanatopropyl(meth)acrylate, 4-isocyanatobutyl(meth)acrylate, a 2-butanoneoxime adduct of 2-isocyanatoethyl(meth)acrylate, a pyrazole adduct of 2-isocyanatoethyl(meth)acrylate, a 3,5-dimethylpyrazole adduct of 2-isocyanatoethyl(meth)acrylate, a 3-methylpyrazole adduct of 2-isocyanatoethyl(meth)acrylate, an ε-caprolactam adduct of 2-isocyanatoethyl(meth)acrylate, a 2-butanoneoxime adduct of 3-isocyanatopropyl(meth)acrylate and a pyrazole adduct of 3-isocyanatopropyl(meth)acrylate.

A 3,5-dimethylpyrazole adduct of 3-isocyanatopropyl(meth)acrylate, a 3-methylpyrazole adduct of 3-isocyanatopropyl(meth)acrylate, an ε-caprolactam adduct of 3-isocyanatopropyl(meth)acrylate, a 2-butanoneoxime adduct of 4-isocyanatobutyl(meth)acrylate, a pyrazole adduct of 4-isocyanatobutyl(meth)acrylate, a 3,5-dimethylpyrazole adduct of 4-isocyanatobutyl(meth)acrylate, a 3-methylpyrazole adduct of 4-isocyanatobutyl(meth)acrylate and an ε-caprolactam adduct of 4-isocyanatobutyl(meth)acrylate.

Methoxymethyl(meth)acrylamide, ethoxymethyl(meth)acrylamide, butoxymethyl(meth)acrylamide, diacetone acrylamide, γ-methacryloyloxypropyltrimethoxysilane, trimethoxyvinylsilane, vinyltrimethoxysilane, dimethylaminoethyl(meth)acrylate, diethylaminoethyl(meth)acrylate, dimethylaminopropyl(meth)acrylate, (meth)acryloylmorpholine, (meth)acryloyloxyethyl trimethylammonium chloride, (meth)acryloyloxypropyl trimethylammonium chloride, (meth)acrylamideethyl trimethylammonium chloride and (meth)acrylamidopropyl trimethylammonium chloride.

t-Butyl(meth)acrylamide sulfonic acid, (meth)acrylamide, N-methyl(meth)acrylamide, N-methylol(meth)acrylamide, N-butoxymethyl(meth)acrylamide, diacetone(meth)acrylamide, glycidyl(meth)acrylate, 2-hydroxyethyl(meth)acrylate, 2-hydroxypropyl(meth)acrylate, 4-hydroxybutyl(meth)acrylate, 3-chloro-2-hydroxypropyl methacrylate, polyoxyalkylene glycol mono(meth)acrylate, (meth)acrylic acid, 2-(meth)acryloyloxyethyl succinic acid, 2-(meth)acryloyloxyhexahydrophthalic acid, 2-(meth)acryloyloxyethyl acid phosphate, allyl(meth)acrylate, 2-vinyl-2-oxazoline and a polycaprolactone ester of 2-vinyl-4-methyl-(2-vinyloxazoline)hydroxyethyl(meth)acrylate.

Tri(meth)allyl isocyanurate (T(M)AIC, manufactured by Nippon Kasei Chemical Company Limited), triallyl cyanurate (TAC, manufactured by Nippon Kasei Chemical Company Limited), phenylglycidylethyl acrylate tolylene diisocyanate (AT-600, manufactured by KYOEISHA CHEMICAL Co., Ltd.), 3-(methylethylketoxime)isocyanatomethyl-3,5,5-trimethylcyclohexyl(2-hydroxyethyl methacrylate) cyanate (TECHCOAT HE-6P, manufactured by Kyoken Kasei).

The monomer (d) is preferably N-methylol(meth)acrylamide, N-butoxymethyl(meth)acrylamide, 2-hydroxyethyl(meth)acrylate, 4-hydroxybutyl(meth)acrylate, a 3,5-dimethylpyrazole adduct of 3-isocyanatopropyl(meth)acrylate, diacetone acrylamide, glycidyl methacrylate, a polycaprolactone ester of hydroxyethyl(meth)acrylate AT-600 (manufactured by KYOEISHA CHEMICAL Co., Ltd.) or TECHCOAT HE-6P (manufactured by Kyoken Kasei).

Monomer (e):

A monomer (e) is a monomer other than the monomers (a), (b), (c) and (d). By having structural units based on the monomer (e), effects such as an improvement in the heat resistance and the abrasion resistance of a coating film of the fluorocopolymer, and suppression of discoloration, can be obtained.

As the monomer (e), the following compounds may be mentioned.

Methyl acrylate, ethyl acrylate, propyl(meth)acrylate, butyl(meth)acrylate, cyclohexyl(meth)acrylate, 2-ethylhexyl (meth)acrylate, butyl methacrylate, n-hexyl(meth)acrylate, vinyl acetate, vinyl propionate, butene, isoprene, butadiene, ethylene, propylene, vinyl ethylene, pentene, ethyl-2-propylene, butylethylene, cyclohexylpropylethylene, decylethylene, dodecylethylene, hexene, isohexylethylene, neopentylethylene, (1,2-diethoxycarbonyl)ethylene, (1,2-dipropoxycarbonyl)ethylene, methoxyethylene, ethoxyethylene, butoxyethylene, 2-methoxypropylene, pentyloxyethylene, cyclopentanoyloxyethylene, cyclopentylacetoxyethylene, styrene, α-methylstyrene, p-methylstyrene, hexylstyrene, octylstyrene, nonylstyrene, chloroprene, tetrafluoroethylene and vinylidene fluoride.

N,N-dimethyl(meth)acrylamide, vinyl alkyl ether, halogenated alkyl vinyl ether, vinyl alkyl ketone, benzyl(meth)acrylate, octyl(meth)acrylate, decyl methacrylate, cyclododecyl acrylate, lauryl(meth)acrylate, cetyl(meth)acrylate, 3-ethoxypropyl acrylate, methoxy-butyl acrylate, 2-ethylbutyl acrylate, 1,3-dimethylbutyl acrylate, 2-methylpentyl acrylate, aziridinylethyl(meth)acrylate, 2-ethylhexylpolyoxyalkylene (meth)acrylate and polyoxyalkylene di(meth)acrylate.

An alkyl crotonate, an alkyl maleate, an alkyl fumarate, an alkyl citraconate, an alkyl mesaconate, triallyl cyanurate, allyl acetate, N-vinylcarbazole, maleimide, N-methylmaleimide, a (meth)acrylate having silicone in its side chain, a (meth)acrylate having a urethane bond, a (meth)acrylate having a polyoxyalkylene chain having a $C_{1-4}$ alkyl group at its terminal, an alkylene di(meth)acrylate, and the like.

The monomer (e) is preferably an alkyl maleate such as dimethyl maleate, diethyl maleate, dibutyl maleate or di-2-ethylhexyl maleate.

Each of the monomers (a) to (e) may be used alone or in combination of two or more.

The peel strength is an index of the strength of bonding, and is an average load per unit width required when a bonded object and an object to which the bonded object adheres.

The total proportion of the structural units based on the monomer (a) and the structural units based on the monomer (b) is preferably from 70 to 100 mass %, more preferably from 70 to 90 mass %, particularly preferably from 70 to 80 mass % to the structural units (100 mass %) based on all the monomers, in view of the peel strength.

The proportion of the structural units based on the monomer (a) in the fluorocopolymer is preferably from 1 to 45 mass %, more preferably from 10 to 30 mass %, particularly preferably from 15 to 20 mass % in view of the peel strength of the release agent composition.

The proportion of the structural units based on the monomer (b) in the fluorocopolymer is preferably from 55 to 99 mass %, more preferably from 55 to 90 mass %, particularly preferably from 55 to 85 mass % in view of the peel strength of the release agent composition.

The proportion of the structural units based on the monomer (c) in the fluorocopolymer is preferably from 0 to 30 mass %, more preferably from 5 to 25 mass %, particularly preferably from 10 to 25 mass % in view of the adhesion to an article and the coating film strength.

The proportion of the structural units based on the monomer (d) in the fluorocopolymer is preferably from 0 to 20 mass %, more preferably from 0 to 10 mass %, particularly preferably from 0.5 to 5 mass % in view of the peel strength, the heat resistance and the abrasion resistance of the coating film.

The proportion of the structural units based on the monomer (e) in the fluorocopolymer is preferably from 0 to 15 mass %, more preferably from 0.1 to 10 mass %, particularly preferably from 0.1 to 5 mass % in view of effects such as an improvement in the heat resistance and the abrasion resistance of the coating film, and suppression of discoloration.

The mass ratio of the structural units based on the monomer (a) to the structural units based on the monomer (b) (the structural units based on the monomer (a)/the structural units based on the monomer (b)) in the fluorocopolymer is from 1/1 to 1/10. It is preferably from 1/2 to 1/5, more preferably from 1/2.5 to 1/4.

The proportion of the structural units based on a monomer in the present invention is calculated based on the amount of charge of the monomer in preparation of the fluorocopolymer.

The mass average molecular weight (Mw) of the fluorocopolymer is at least 40,000, preferably at least 50,000, further preferably at least 80,000. When the mass average molecular weight (Mw) of the fluorocopolymer is at least 40,000, good dynamic water repellency and post-air-drying water repellency will be obtained. On the other hand, the mass average molecular weight (Mw) of the fluorocopolymer is preferably at most 1,000,000, particularly preferably at most 500,000 from the viewpoint of the film-forming property and the storage stability.

The number average molecular weight (Mn) of the fluorocopolymer is preferably at least 20,000, particularly preferably at least 30,000. On the other hand, the number average molecular weight (Mn) of the fluorocopolymer is preferably at most 500,000, particularly preferably at most 200,000.

The mass average molecular weight (Mw) and the number average molecular weight (Mn) of the fluorocopolymer are molecular weights as calculated as polystyrene measured by means of gel permeation chromatography (GPC).

(Medium)

The medium may, for example, be water, an alcohol, a glycol, a glycol ether, a halogen compound, a hydrocarbon, a ketone, an ester, an ether, a nitrogen compound or an organic acid, and in view of solubility and the handling efficiency, it is preferably at least one aqueous medium selected from the group consisting of water, an alcohol, a glycol, a glycol ether and a glycol ester.

The alcohol may, for example, be methanol, ethanol, 1-propanol, 2-propanol, 1-butanol, 2-butanol, 2-methylpropanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-pentanol, 4-methyl-2-pentanol, 2-ethyl-1-butanol, 1-heptanol, 2-heptanol or 3-heptanol.

The glycol and the glycol ether may, for example, be ethylene glycol, ethylene glycol monomethyl ether, ethylene glycol monoethyl ether, ethylene glycol monobutyl ether, ethylene glycol monomethyl ether acetate, ethylene glycol monoethyl ether acetate, ethylene glycol monobutyl ether acetate, propylene glycol, glycol ether such as propylene glycol monomethyl ether, propylene glycol monoethyl ether, propylene glycol dimethyl ether, dipropylene glycol, dipropylene glycol monomethyl ether, dipropylene glycol dimethyl ether, dipropylene glycol monoethyl ether, tripropylene glycol, tripropylene glycol monomethyl ether, polypropylene glycol or hexylene glycol.

The halogenated compound may, for example, be a halogenated hydrocarbon or a halogenated ether.

The halogenated hydrocarbon may, for example, be a hydrochlorofluorocarbon, a hydrofluorocarbon or a hydrobromocarbon.

The halogenated ether may, for example, be a hydrofluoroether.

The hydrofluoroether may, for example, be a separation-type hydrofluoroether or a non-separation-type hydrofluoroether. The separation-type hydrofluoroether is a compound wherein a $R^F$ group or a perfluoroalkylene group, and an alkyl group or an alkylene group, are bonded via an etheric oxygen atom. The non-separation-type hydrofluoroether is a hydrofluoroether containing a partially fluorinated alkyl or alkylene group.

The hydrocarbon may, for example, be an aliphatic hydrocarbon, an alicyclic hydrocarbon or an aromatic hydrocarbon.

The aliphatic hydrocarbon may, for example, be pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane or hexadecane.

The alicyclic hydrocarbon may, for example, be cyclopentane, methylcyclopentane, cyclohexane, methylcyclohexane or ethylcyclohexane.

The aromatic hydrocarbon may, for example, be benzene, toluene or xylene.

The ketone may, for example, be acetone, methyl ethyl ketone, 2-pentanone, 3-pentanone, 2-hexanone or methyl isobutyl ketone.

The ester may, for example, be methyl acetate, ethyl acetate, butyl acetate, methyl propionate, methyl lactate, ethyl lactate or pentyl lactate.

The ether may, for example, be diisopropyl ether, dioxane or tetrahydrofuran.

The nitrogen compound may, for example, be pyridine, N,N-dimethylformamide, N,N-dimethylacetamide or N-methylpyrrolidone.

The organic acid may, for example, be acetic acid, propionic acid, malic acid or lactic acid.

As the medium, one type may be used alone, or two or more types may be used as mixed. In a case where the medium is used as a mixture of two or more types, it is preferred to use it as mixed with water. By using a mixed medium, it is easy to control the solubility or dispersibility of the fluorocopolymer and to adjust the penetrating property to an article, the wettability, the solvent-drying rate, etc. during the processing.

(Surfactant)

The surfactant may, for example, be a hydrocarbon type surfactant or a fluorine type surfactant, and each of which may, for example, be an anionic surfactant, a nonionic surfactant, a cationic surfactant, or an amphoteric surfactant.

As the surfactant, from the viewpoint of the dispersion stability, it is preferred to use a nonionic surfactant and a cationic surfactant or an amphoteric surfactant in combination or to use an anionic surfactant alone, and it is more preferred to use a nonionic surfactant and a cationic surfactant in combination.

The ratio of the nonionic surfactant to the cationic surfactant (nonionic surfactant/cationic surfactant) is preferably from 97/3 to 40/60 (mass ratio).

In a specific combination of a nonionic surfactant and a cationic surfactant, it is possible to reduce the total amount of the surfactants to a level of at most 5 mass % based on the fluorocopolymer (100 mass %), whereby the hydrophilicity of the release agent composition tends to be small, and excellent releasability can be imparted to an article.

The nonionic surfactant is preferably at least one member selected from the group consisting of surfactants $s^1$ to $s^6$.

Surfactant $s^1$:

Surfactant $s^1$ is a polyoxyalkylene monoalkyl ether, a polyoxyalkylene monoalkenyl ether, a polyoxyalkylene monoalkapolyenyl ether or a polyoxyalkylene monopolyfluoroalkyl ether.

Surfactant $s^1$ is preferably a polyoxyalkylene monoalkyl ether, a polyoxyalkylene monoalkenyl ether or a polyoxyalkylene monopolyfluoroalkyl ether. As surfactant $s^1$, one type may be used alone, or two or more types may be used in combination.

As the alkyl, alkenyl, alkapolyenyl or polyfluoroalkyl group (hereinafter the alkyl, alkenyl, alkapolyenyl and polyfluoroalkyl groups may generally be referred to as a $R^s$ group), a $C_{4-26}$ group is preferred. The $R^s$ group may be linear or branched. The branched $R^s$ group is preferably a secondary alkyl group, a secondary alkenyl group or a secondary alkapolyenyl group. The $R^s$ group may have some or all of hydrogen atoms substituted by fluorine atoms.

A specific example of the $R^s$ group may, for example, be an octyl group, a dodecyl group, a tetradecyl group, a hexadecyl group, a stearyl group (an octadecyl group), a behenyl group (a docosyl group), an oleyl group (a 9-octadecenyl group), a heptadecylfluorooctyl group, a tridecylfluorohexyl group, a 1H,1H,2H,2H-tridecylfluorooctyl group or a 1H,1H,2H,2H-nonafluorohexyl group.

The polyoxyalkylene (hereinafter referred to as POA) chain is preferably a chain wherein at least two of a polyoxyethylene (hereinafter referred to as POE) chain and/or a polyoxypropylene (hereinafter referred to as POP) chain are linked. The POA chain may be a chain composed of one type of POA chain or a chain composed of two or more types of POA chains. When it is composed of two or more types of POA chains, the respective POA chains are preferably linked in a block form.

Surfactant $s^1$ is more preferably a compound ($s^{11}$).

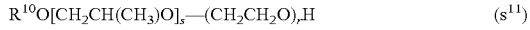

wherein $R^{10}$ is an alkyl group having at least 8 carbon atoms or an alkenyl group having at least 8 carbon atoms, r is an integer of from 5 to 50, and s is an integer of from 0 to 20. $R^{10}$ may be one wherein some of hydrogen atoms are substituted by fluorine atoms.

When r is at least 5, the fluorocopolymer becomes soluble in water and will be uniformly dissolved in an aqueous medium, whereby the penetrating property of the release agent composition to an article will be good. When r is at most 50, hydrophilicity will be suppressed, and the peel strength will be good.

When s is at most 20, the fluorocopolymer becomes soluble in water and will be uniformly dissolved in an aqueous medium, whereby the penetrating property of the release agent composition to an article will be good.

In a case where r and s are at least 2, the POE chains and the POP chains will be linked in a block form.

$R^{10}$ is preferably linear or branched.

r is preferably an integer of from 10 to 30.

s is preferably an integer of from 0 to 10.

The compound ($s^{11}$) may, for example, be the following compounds, whereby the POE chains and the POP chains are linked in a block form.

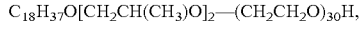

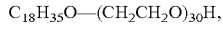

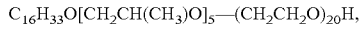

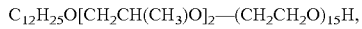

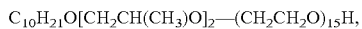

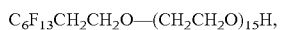

$C_6F_{13}CH_2CH_2O[CH_2CH(CH_3)O]_2$—$(CH_2CH_2O)_{15}H$, $C_4F_9CH_2CH_2O[CH_2CH(CH_3)O]_2$—$(CH_2CH_2O)_{15}H$.

Surfactant $s^2$:

Surfactant $s^2$ is a nonionic surfactant made of a compound having at least one carbon-carbon triple bond and at least one hydroxy group in its molecule.

Surfactant $s^2$ is preferably a nonionic surfactant made of a compound having one carbon-carbon triple bond and one or two hydroxy groups in its molecule.

Surfactant $s^2$ may have a POA chain in its molecule. The POA chain may be a POE chain, a POP chain, a chain wherein a POE chain and a POP chain are randomly linked, or a chain wherein a POE chain and a POP chain are linked in a block form.

Surfactant $s^2$ is preferably compounds ($s^{21}$) to ($s^{24}$).

$$HO-CR^{11}R^{12}-C\equiv C-CR^{13}R^{14}-OH \quad (s^{21})$$

$$HO-(A^1O)_u-CR^{11}R^{12}-C\equiv C-CR^{13}R^{14}-(OA^2)_v-OH \quad (s^{22})$$

$$HO-CR^{15}R^{16}-C\equiv C-H \quad (s^{23})$$

$$HO-(A^3O)_w-CR^{15}R^{16}-C\equiv C-H \quad (s^{24})$$

Each of $A^1$ to $A^3$ is an alkylene group.

Each of u and v is an integer of at least 0, and (u+v) is an integer of at least 1.

w is an integer of at least 1.

In a case where each of u, v and w is at least 2, each of $A^1$ to $A^3$ may be the same or different.

The POA chain is preferably a POE chain, a POP chain or a chain containing a POE chain and a POP chain. The number of repeating units of the POA chain is preferably from 1 to 50.

Each of $R^{11}$ to $R^{16}$ is a hydrogen atom or an alkyl group.

The alkyl group is preferably a $C_{1-12}$ alkyl group, more preferably a $C_{1-4}$ alkyl group. The alkyl group may, for example, be a methyl group, an ethyl group, a propyl group, a butyl group or an isobutyl group.

The compound ($s^{22}$) is preferably a compound ($s^{26}$):

$$\begin{array}{c} (CH_3)_2CHCH_2 \quad CH_3 \\ | \quad\quad\quad | \\ HO(CH_2CH_2O)_xC-C\equiv C-C(OCH_2CH_2)_yOH \\ | \quad\quad\quad | \\ CH_3 \quad\quad CH_2CH(CH_3)_2 \end{array} \quad (s^{25})$$

wherein each of x and y is an integer of from 0 to 100.

As the compound ($s^{25}$), one type may be used alone, or two or more types may be used in combination.

The compound ($s^{25}$) is preferably a compound wherein x and y are 0, a compound wherein the sum of x and y is from 1 to 4 on average, or a compound wherein the sum of x and y is from 10 to 30 on average.

Surfactant $s^3$:

Surfactant $s^3$ is a nonionic surfactant made of a compound wherein a POE chain and a POA chain having at least two oxyalkylenes having at least 3 carbon atoms continuously linked, are linked, and both terminals are hydroxy groups.

Such a POA chain is preferably polyoxytetramethylene (hereinafter referred to as POT) and/or a POP chain.

Surfactant $s^3$ is preferably a compound ($s^{31}$) or a compound ($s^{32}$):

$$HO(CH_2CH_2O)_{g1}(C_3H_6O)_t(CH_2CH_2O)_{g2}H \quad (s^{31})$$

$$HO(CH_2CH_2O)_{g1}(CH_2CH_2CH_2CH_2O)_t(CH_2CH_2O)_{g2}H \quad (s^{32})$$

g1 is an integer of from 0 to 200.

t is an integer of from 2 to 100.

g2 is an integer of from 0 to 200.

When g1 is 0, g2 is an integer of at least 2. When g2 is 0, g1 is an integer of at least 2.

—$C_3H_6O$— may be —$CH(CH_3)CH_2$—, —$CH_2CH(CH_3)$—, or a mixture of —$CH(CH_3)CH_2$— and —$CH_2CH(CH_3)$—.

The POA chain is in a block-form.

Surfactant $s^3$ may, for example, be the following compounds:

$HO$—$(CH_2CH_2O)_{15}$—$(C_3H_6O)_{35}$—$(CH_2CH_2O)_{15}H$, $HO$—$(CH_2CH_2O)_8$—$(C_3H_6O)_{35}$—$(CH_2CH_2O)_8H$, $HO$—$(CH_2CH_2O)_{45}$—$(C_3H_6O)_{17}$—$(CH_2CH_2O)_{45}H$, $HO$—$(CH_2CH_2O)_{34}$—$(CH_2CH_2CH_2CH_2O)_{28}$—$(CH_2CH_2O)_{34}H$.

Surfactant $s^4$:

Surfactant $s^4$ is a nonionic surfactant having an amine oxide moiety in its molecule.

Surfactant $s^4$ is preferably a compound ($s^{41}$):

$$(R^{17})(R^{18})(R^{19})N(\rightarrow O) \quad (s^{41})$$

Each of $R^{17}$ to $R^{19}$ is a monovalent hydrocarbon group.

In the present invention, a surfactant having an amine oxide is regarded as a nonionic surfactant.

As the compound ($s^{41}$), one type may be used alone, or two or more types may be used in combination.

The compound ($s^{41}$) is preferably a compound ($s^{42}$) from the viewpoint of the dispersion stability of the fluorocopolymer.

$$(R^{20})(CH_3)_2N(\rightarrow O) \quad (s^{42})$$

$R^{20}$ is a $C_{6-22}$ alkyl group, a $C_{6-22}$ alkenyl group, a phenyl group having a $C_{6-22}$ alkyl group bonded thereto, a phenyl group having a $C_{6-22}$ alkenyl group bonded thereto, or a $C_{6-13}$ fluoroalkyl group. $R^{20}$ is preferably a $C_{8-22}$ alkyl group, a $C_{8-22}$ alkenyl group or a $C_{4-9}$ polyfluoroalkyl group.

The compound ($s^{42}$) may, for example, be the following compounds:

$[H(CH_2)_{12}](CH_3)_2N(\rightarrow O)$ $[H(CH_2)_{14}](CH_3)_2N(\rightarrow O)$ $[H(CH_2)_{16}](CH_3)_2N(\rightarrow O)$ $[H(CH_2)_{18}](CH_3)_2N(\rightarrow O)$ $[F(CF_2)_6(CH_2)_2](CH_3)_2N(\rightarrow O)$ $[F(CF_2)_4(CH_2)_2](CH_3)_2N(\rightarrow O)$ Surfactant $s^5$:

Surfactant $s^5$ is a nonionic surfactant made of a polyoxyethylene mono(substituted phenyl)ether or its condensate.

The substituted phenyl group is preferably a phenyl group substituted by a monovalent hydrocarbon group, more preferably a phenyl group substituted by an alkyl group, an alkenyl group or a styryl group.

Surfactant $s^5$ is preferably a condensate of a polyoxyethylenemono(alkylphenyl) ether, a condensate of a polyoxyethylenemono(alkenylphenyl)ether, a polyoxyethylenemono(alkylphenyl)ether, a polyoxyethylenemono(alkenylphenyl)ether or a polyoxyethylenemono[(alkyl)(styryl)phenyl]ether.

The polyoxyethylenemono(substituted phenyl)ether or its condensate may, for example, be a formaldehyde condensate of polyoxyethylenemono(nonylphenyl)ether, polyoxyethylenemono(nonylphenyl)ether, polyoxyethylenemono(octylphenyl)ether, polyoxyethylenemono(oleylphenyl)ether, polyoxyethylenemono[(nonyl)(styryl)phenyl]ether or polyoxyethylenemono[(oleyl)(styryl)phenyl]ether.

Surfactant $s^6$:

Surfactant $s^6$ is a nonionic surfactant made of a fatty acid ester of a polyol.

The polyol represents glycerol, sorbitan, sorbit, polyglycerin, polyethylene glycol, polyoxyethylene glyceryl ether, polyoxyethylenesorbitan ether or polyoxyethylenesorbit ether.

Surfactant $s^6$ may be a 1:1 (molar ratio) ester of stearic acid and polyethylene glycol, a 1:4 (molar ratio) ester of an ether of sorbit with polyethylene glycol and oleic acid, a 1:1 (molar ratio) ester of an ether of polyoxyethylene glycol with sorbitan and stearic acid, a 1:1 (molar ratio) ester of an ether of polyethylene glycol with sorbitan and oleic acid, a 1:1 (molar ratio) ester of dodecanoic acid and sorbitan, a 1:1 or 2:1 (molar ratio) ester of oleic acid and decaglycerol, or a 1:1 or 2:1 (molar ratio) ester of stearic acid and decaglycerol.

Surfactant $s^7$:

In a case where the surfactant contains a cationic surfactant, such a cationic surfactant is preferably surfactant $s^7$.

Surfactant $s^7$ is a cationic surfactant in a substituted ammonium salt form.

Surfactant $s^7$ is preferably an ammonium salt having at least one hydrogen atom bonded to the nitrogen atom substituted by an alkyl group, an alkenyl group or a POA chain having a terminal hydroxy group, more preferably a compound ($s^{71}$):

$[(R^{21})_4N^+].X^-$      ($s^{71}$)

$R^{21}$ is a hydrogen atom, a $C_{1-22}$ alkyl group, a $C_{2-22}$ alkenyl group, a $C_{1-9}$ fluoroalkyl group or a POA chain having a terminal hydroxy group. Four $R^{21}$ may be the same or different, provided that the four $R^{21}$ are not simultaneously hydrogen atoms.

$R^{21}$ is preferably a $C_{6-22}$ long chain alkyl group, a $C_{6-22}$ long chain alkenyl group or a $C_{1-9}$ fluoroalkyl group.

In a case where $R^{21}$ is an alkyl group other than the long chain alkyl group, $R^{21}$ is preferably a methyl group or an ethyl group.

In a case where $R^{21}$ is a POA chain having a terminal hydroxy group, the POA chain is preferably a POE chain.

$X^-$ is a counter ion.

$X^-$ is preferably a chlorine ion, an ethylsulfuric acid ion or an acetic acid ion.

The compound ($s^{71}$) may, for example, be monostearyl trimethylammonium chloride, monostearyldimethylmonoethylammonium ethylsulfate, mono(stearyl)monomethyldi(polyethylene glycol) ammonium chloride, monofluorohexyl trimethylammonium chloride, di(beef tallow alkyl)dimethylammonium chloride or dimethylmonococonutamine acetate.

Surfactant $s^8$:

In a case where the surfactant contains an amphoteric surfactant, such an amphoteric surfactant is preferably surfactant $s^8$.

Surfactant $s^8$ is an alanine, an imidazolinium betaine, an amide betaine or an acetic acid betaine.

The hydrophobic group is preferably a $C_{6-22}$ long chain alkyl group, a $C_{6-22}$ long chain alkenyl group or a $C_{1-9}$ fluoroalkyl group.

Surfactant $s^8$ may, for example, be dodecyl betaine, stearyl betaine, dodecylcarboxymethylhydroxyethylimidazolinium betaine, dodecyldimethylaminoacetic acid betaine or a fatty acid amide propyldimethylaminoacetic acid betaine.

Surfactant $s^9$:

As the surfactant, surfactant $s^9$ may be used.

Surfactant $s^9$ is a polymer surfactant made of a block copolymer or a random copolymer of a hydrophilic monomer with a hydrocarbon type hydrophobic monomer and/or a fluorinated hydrophobic monomer, or a hydrophobically modified product of a hydrophilic copolymer.

Surfactant $s^9$ may, for example, be a block or random copolymer of polyethylene glycol(meth)acrylate with a long chain alkyl acrylate, a block or random copolymer of polyethylene glycol(meth)acrylate with a fluoro(meth)acrylate, a block or random copolymer of vinyl acetate with a long chain alkyl vinyl ether, a block or random copolymer of vinyl acetate with a long chain alkyl vinyl ester, a polymer of styrene with maleic anhydride, a condensate of polyvinyl alcohol with stearic acid, a condensate of polyvinyl alcohol with stearyl mercaptan, a condensate of polyallylamine with stearic acid, a condensate of polyethyleneimine with stearyl alcohol, methylcellulose, hydroxypropyl methylcellulose or hydroxyethyl methylcellulose.

Commercial products of surfactant $s^9$ include, for example, MP polymer (Product No.: MP-103 or MP-203) manufactured by KURARAY CO., LTD., SMA resins manufactured by Elf Atochem Inc, METOLOSE manufactured by Shin-Etsu Chemical Co., Ltd., EPOMIN RP manufactured by NIPPON SHOKUBAI Co., Ltd. and Surflon (Product No.: S-381 or S-393) manufactured by AGC Seimi Chemical Co., Ltd.

In a case where the medium is an organic solvent, or the mixing ratio of an organic solvent is large, surfactant $s^9$ is preferably surfactant $s^{91}$.

Surfactant $s^{91}$: A polymer surfactant made of a block copolymer or random copolymer of a lipophilic monomer with a fluorinated monomer (or its polyfluoroalkyl modified product).

Surfactant $s^{91}$ may, for example, be a copolymer of an alkyl acrylate with a fluoro(meth)acrylate, or a copolymer of an alkyl vinyl ether with a fluoroalkyl vinyl ether.

Commercial products of surfactant $s^{91}$ include Surflon (Product No.: S-383 or SC-100 series) manufactured by AGC Seimi Chemical Co., Ltd.

As a combination of surfactants, from the viewpoint of excellent releasability of the release agent composition, and from the viewpoint of the stability of the obtained emulsion, a combination of surfactants $s^1$, $s^2$ and $s^7$, a combination of surfactants $s^1$, $s^3$ and $s^7$ or a combination of surfactants $s^1$, $s^2$, $s^3$ and $5^7$ is preferred, and such a combination wherein the surfactant $s^7$ is a compound ($s^{71}$) is more preferred.

The total amount of surfactants is preferably from 1 to 6 mass % based on the fluorocopolymer (100 mass %).

(Additives)

The additives include, for example, a penetrant, a defoamer, a water-absorbing agent, an antistatic agent, an anticrease agent, a texture-adjusting agent, a film-forming assistant, a water-soluble polymer (such as polyacrylamide or polyvinyl alcohol), a thermosetting agent (such as a melamine resin or a urethane resin), an epoxy curing agent (such as isophthalic acid dihydrazide, adipic acid dihydrazide, sebacic acid dihydrazide, dodecanedioic acid dihydrazide, 1,6-hexamethylenebis(N,N-dimethylsemicarbazide), 1,1,1',1'-tetramethyl-4,4'-(methylene-di-p-phenylene) disemicarbazide or spiroglycol), a thermosetting catalyst, a crosslinking catalyst, a synthetic resin and a fiber-stabilizer.

(Method for Producing Release Agent Composition)

The release agent composition of the present invention is produced, for example, by the following method (i) or (ii):

(i) A method which comprises polymerizing a monomer mixture comprising the monomers (a) and (b) and further containing the monomers (c), (d) and (e) as the case requires, in a medium in the presence of a surfactant and a polymerization initiator to obtain a solution, dispersion or emulsion of the fluorocopolymer, and adding another medium, another surfactant and additives, as the case requires.

(ii) A method which comprises polymerizing a monomer mixture comprising the monomers (a) and (b) and further containing the monomers (c), (d) and (e) as the case requires, in a medium in the presence of a surfactant and a polymerization initiator, to obtain a solution, dispersion or emulsion of the fluorocopolymer, then separating the fluorocopolymer and adding a medium, a surfactant and, if required, additives, to the fluorocopolymer.

The polymerization method for the fluorocopolymer of the present invention may, for example, be a dispersion polymerization method, an emulsion polymerization method or a suspension polymerization method.

The method for producing a release agent composition is preferably a method wherein the monomers (a) and (b) and further the monomers (c), (d) and (e) as the case requires, are polymerized by emulsion polymerization in an aqueous medium in the presence of a surfactant and a polymerization initiator to obtain an emulsion of the fluorocopolymer.

With a view to improving the yield of the fluorocopolymer, it is preferred to pre-emulsify the mixture comprising the monomers, the surfactant and the aqueous medium, prior to the emulsion polymerization. For example, the mixture comprising the monomers, the surfactant and the aqueous medium is mixed and dispersed by a homomixer or a high pressure emulsifier.

The polymerization initiator may, for example, be a thermal polymerization initiator, a photopolymerization initiator, a radiation polymerization initiator, a radical polymerization initiator or an ionic polymerization initiator, and a water-soluble or oil-soluble radical polymerization initiator is preferred.

As the radical polymerization initiator, a common initiator such as an azo type polymerization initiator, a peroxide type polymerization initiator or a redox type initiator is employed depending upon the polymerization temperature. As the radical polymerization initiator, an azo type compound is particularly preferred, and in a case where polymerization is carried out in an aqueous medium, a salt of an azo type compound is more preferred. The polymerization temperature is preferably from 20 to 150° C. The amount of the radical polymerization initiator is preferably from 0.1 to 1 part by mass, more preferably from 0.3 to 0.6 part by mass, per 100 parts by mass of the monomer mixture.

At the time of polymerization of the monomers, a molecular weight-controlling agent may be employed. The molecular weight-controlling agent is preferably an aromatic compound, a mercapto alcohol or a mercaptan, particularly preferably an alkylmercaptan. The molecular weight-controlling agent may, for example, be mercaptoethanol, n-octylmercaptan, n-dodecylmercaptan, t-dodecylmercaptan, stearylmercaptan or α-methylstyrene dimer ($CH_2$=C(Ph) $CH_2C(CH_3)_2$Ph wherein Ph is a phenyl group). The amount of the molecular weight-controlling agent is preferably from 0.1 to 3 parts by mass, more preferably from 0.5 to 1.5 parts by mass, per 100 parts by mass of the monomer mixture.

From the viewpoint of the peel strength of the release agent composition, the proportion of the monomer (a) in the monomer mixture is preferably from 1 to 45 mass %, more preferably from 10 to 30 mass %, particularly preferably from 15 to 20 mass %.

From the viewpoint of the peel strength of the release agent composition, the proportion of the monomer (b) in the monomer mixture is preferably from 5 to 99 mass %, more preferably from 55 to 90 mass %, particularly preferably from 55 to 85 mass %.

From the viewpoint of the adhesion to an article and the coating film strength, proportion of the monomer (c) in the monomer mixture is preferably from 0 to 30 mass %, more preferably from 5 to 25 mass %, particularly preferably from 10 to 25 mass %.

From the viewpoint of the peel strength, the heat resistance and the abrasion resistance of the coating film, the proportion of the monomer (d) in the monomer mixture is preferably from 0 to 20 mass %, more preferably from 0 to 10 mass %, particularly preferably from 0.5 to 5 mass %.

From the viewpoint of effects such as an improvement in the heat resistance and the abrasion resistance of the coating film, and suppression of discoloration, the proportion of the monomer (e) in the monomer mixture is preferably from 0 to 15 mass %, more preferably from 0.1 to 10 mass %, particularly preferably from 0.1 to 5 mass %.

The mass ratio of the monomer (a) to the monomer (b) (the structural units based on the monomer (a)/the structural units based on the monomer (b)) in the monomer mixture is from 1/1 to 1/10. It is preferably from 1/2 to 1/5, particularly preferably from 1/2.5 to 1/4.

In the release agent composition of the present invention, it is preferred that the fluorocopolymer is dispersed in the form of particles in the medium. The average particle size of the fluorocopolymer is preferably from 10 to 1,000 nm, more preferably from 10 to 300 nm, particularly preferably from 10 to 200 nm. When the average particle size is within such a range, it will be unnecessary to use a surfactant, a dispersant, etc. in a large amount, the releasability will be good, and the dispersed particles can stably be present in the medium without precipitation. The average particle size can be measured by e.g. a dynamic light-scattering apparatus or an electron microscope.

Immediately after the production of the release agent composition, the solid content concentration of the release agent composition of the present invention is preferably from 25 to 40 mass % based on the release agent composition (100 mass %).

In a case where the substrate is treated, it is preferred to dilute the release agent composition immediately after the production with the above-described medium.

In a case where the substrate is treated, the solid content concentration of the release agent composition of the present invention is preferably from 0.2 to 5 mass % based on the release agent composition (100 mass %).

The solid content concentration of the release agent composition is calculated from the mass of the release agent composition before heating and the mass after dried in a convection dryer at 120° C. for 4 hours.

The above-described release agent composition of the present invention, which comprises a combination of specific structural units, can impart moderate releasability to the surface of an article, and is also excellent in the durability and texture.

<Article>

By treating with the release agent composition of the present invention, it is possible to impart releasability to the surface of various substrates such as nonwoven fabrics, resins, paper, leather, metals, stones, concrete, gypsum and glass. Application to paper is particularly preferred.

In a case where the release agent composition is used as a release agent between two different substrates, the substrates may be paper and glass, paper and fibers, or the like. Specifically, it can be used for production of a protective material for an adhesive face of repositional notes, pressure-sensitive adhesive sheets or tapes, a release film or release paper.

With respect to the release paper obtained by treatment with the release agent composition of the present invention, the object substrate to which the release paper is once bonded and then separated, may be glass or cloth.

The treating method may, for example, be a method of coating or impregnating an article with the release agent composition by a known coating method, followed by drying.

The peel strength of an article of the present invention is an index of the adhesion when a pressure-sensitive adhesive tape or a substrate coated with a pressure-sensitive adhesive component is bonded to an article, and can be measured e.g. by a tensile tester. The peel strength of an article is preferably from 0.1 to 0.6 N, more preferably from 0.15 to 0.5 N under measurement conditions as described in the following Examples. If the peel strength is higher than 0.6 N, when substrates are separated, they may be broken. On the other hand, if the peel strength is smaller than 0.1 N, the adhesion to bond the substrates may not be sufficient.

By treating an article with the release agent composition of the present invention, it is possible to impart high quality releasability to the article. Further, it is possible to impart excellent adhesion to the surface and to impart releasability even by curing at a low temperature. Further, it is possible to maintain the performance stably without substantial deterioration of the performance by abrasion. Further, when paper is treated, it is possible to impart excellent releasability even under a low temperature drying condition. In a case where the surface of a resin, glass or a metal is treated, it is possible to form a coating film which has favorable adhesion to the article and which is excellent in the film-forming property.

EXAMPLES

Now, the present invention will be described in detail with reference to Examples, but it should be understood that the present invention is by no means thereby restricted.

Examples 1 to 7 are Examples of the present invention, and Example 8 is a Comparative Example.

(Abbreviations)

Monomer (a):

C6FMA: $C_6F_{13}C_2H_4OC(O)C(CH_3)=CH_2$

Monomer (b):

BeA: behenyl acrylate

StA: stearyl acrylate

Monomer (c):

VCM: vinyl chloride

Monomer (d):

HEMA: 2-hydroxyethyl methacrylate

HEA: 2-hydroxyethyl acrylate

NMAM: N-methylol acrylamide

TAC: triallyl cyanurate

MOI-BP: A 3,5-dimethylpyrazole adduct of 2-isocyanatoethyl(meth)acrylate (manufactured by SHOWA DENKO K.K., Karenz MOI-BP)

Monomer (e):

DOM: di-2-ethylhexyl maleate

Surfactant $s^1$:

PEO-20: 10 mass % aqueous solution of polyoxyethylene oleyl ether (manufactured by Kao Corporation, EMULGEN E430, about 26 mol adduct of ethylene oxide)

Surfactant $s^7$:

STMC: 10 mass % aqueous solution of monostearyl trimethylammonium chloride (manufactured by Lion Corporation, ARQUAD 18-63)

Surfactant $s^3$:

P-204: 10 mass % aqueous solution of ethylene oxide propylene oxide polymer (manufactured by NOF Corporation, PRONONE 204, proportion of ethylene oxide: 40 mass %)

Molecular Weight-Controlling Agent:

nDoSH: n-dodecylmercaptane

Polymerization Initiator:

VA-061A: 10 mass % aqueous solution of an acetate of 2,2'-azobis[2-(2-imidazolin-2-yl)propane] (manufactured by Wako Pure Chemical Industries, Ltd., VA-061)

Medium:

DPG: dipropylene glycol

Water: deionized water

Example 1

Into a glass beaker, 43.3 g of C6FMA, 146.4 g of BeA, 10.2 g of DOM, 2.5 g of HEMA, 2.5 g of nDoSH, 63.7 g of PEO-20, 12.7 g of P-204, 12.7 g of STMC, 76.4 g of DPG and 314.5 g of water were introduced, then heated at 60° C. for 30 minutes and mixed by means of a homomixer (manufactured by NIHONSEIKI KAISHA LTD., Biomixer) to obtain a mixed liquid.

The obtained mixed liquid was treated at 40 MPa by means of a high pressure emulsifying machine (manufactured by APV Rannie, Mini lab) while maintaining the temperature at 60° C. to obtain an emulsified liquid. The obtained emulsified liquid was put into a stainless steel reactor and cooled to a temperature of at most 40° C. 12.7 g of VA-061 was added, the vapor phase was substituted by nitrogen, 52.2 g of VCM was introduced, and a polymerization reaction was carried out at 60° C. for 15 hours with stirring, to obtain an emulsion of a copolymer. The proportions (mass ratio) of structural units based on the respective monomers are shown in Table 2.

Examples 2 to 8

An emulsion of a copolymer was obtained in the same manner as in Example 1 except that the type or the amount of charge of the respective monomers was changed as identified in Table 1. The proportions (mass ratio) of structural units based on the respective monomers are shown in Table 2.

TABLE 1

| | Monomer composition (mass g) | | | | | | | | | |
|---|---|---|---|---|---|---|---|---|---|---|
| | C6FMA (a) | BeA (b) | StA (b) | VCM (c) | DOM (e) | HEMA (d) | HEA (d) | N-MAM (d) | TAC (d) | MOI-BP (d) |
| Ex. 1 | 43.2 | 146.1 | | 52.1 | 10.2 | 2.5 | | | | |
| Ex. 2 | 45.7 | 152.5 | | 53.4 | | 2.5 | | | | |
| Ex. 3 | 48.3 | 203.3 | | | | | | 2.5 | | |
| Ex. 4 | 45.7 | 91.5 | 61.0 | 53.4 | | | | 2.5 | | |
| Ex. 5 | 45.7 | 50.8 | 102.9 | 53.4 | | | | 1.3 | | |
| Ex. 6 | 45.7 | 25.4 | 128.3 | 53.4 | | | | 1.3 | | |
| Ex. 7 | 45.7 | | 153.7 | 53.4 | | | 1.3 | | | |
| Ex. 8 | 127.1 | | 116.9 | | | | | | 5.1 | 5.1 |

TABLE 2

| | Monomer composition (mass g) | | | | | | | | | | | Particle |
|---|---|---|---|---|---|---|---|---|---|---|---|---|
| | C6FMA (a) | BeA (b) | StA (b) | VCM (c) | DOM (e) | HEMA (d) | HEA (d) | N-MAM (d) | TAC (d) | MOI-BP (d) | (a)/(b) | size (nm) |
| Ex. 1 | 17 | 57.5 | | 20.5 | 4 | 1 | | | | | 17/78 | 193 |
| Ex. 2 | 18 | 60 | | 21 | | 1 | | | | | 18/81 | 182 |
| Ex. 3 | 19 | 80 | | | | | | 1 | | | 19/80 | 188 |
| Ex. 4 | 18 | 36 | 24 | 21 | | | | 1 | | | 18/60 | 159 |
| Ex. 5 | 18 | 20 | 40.5 | 21 | | | | 0.5 | | | 18/60.5 | 142 |
| Ex. 6 | 18 | 10 | 50.5 | 21 | | | | 0.5 | | | 18/60.5 | 120 |
| Ex. 7 | 18 | | 60.5 | 21 | | | 0.5 | | | | 18/60.5 | 126 |
| Ex. 8 | 50 | | 46 | | | | | | 2 | 2 | 50/46 | 135 |

<Evaluation of Releasability>
(Preparation of Substrate)

Each of the release agent compositions in Examples 1 to 8 and 10 g of oxidized starch (manufactured by NIHON SHOKUHIN KAKO CO., LTD., MS-3600) were diluted with from 80 to 90 g of water (solid content concentration of the release agent composition: 2 mass %), and the diluted liquid was applied to a PPC paper and dried at 100° C. for 60 seconds. The coating amount of the diluted liquid was about 30 g/m².

(Releasability)

On the treated substrate, a polyester tape (manufactured by NITTO DENKO CORPORATION) having a length of 25 mm was bonded, and a 2 kg pressure roller was rolled thereon two laps. The substrate to which the polyester tape was bonded was set in a tensile tester to evaluate the peel strength. As the measurement conditions of the peel tester, the speed was 300 mm/min, the grip width was 25 mm, and the peel distance was 50 mm. The results are shown in Table 3.

TABLE 3

| | Peel strength (N) |
|---|---|
| Ex. 1 | 0.24 |
| Ex. 2 | 0.32 |
| Ex. 3 | 0.35 |
| Ex. 4 | 0.40 |
| Ex. 5 | 0.19 |
| Ex. 6 | 0.45 |
| Ex. 7 | 0.20 |
| Ex. 8 | 0.81 |

<Evaluation of Mechanical Stability>

Each of the release agent compositions in Examples 1 to 8 was diluted with water having hardness adjusted to 150 by calcium carbonate, and DIMAFIX ES (manufactured by Meisei Chemical Works, Ltd.) as an anionic substance was added. On that occasion, the concentration of the release agent composition was adjusted to be 6 g/L, and the concentration of the anionic substance was adjusted to be 0.15 g/L. The mixed liquid was stirred by a homomixer, subjected to filtration through a black woven fabric, and the degree of precipitates was visually evaluated by five grades of from score 5 being favorable to score 1. The results are shown in Table 4.

TABLE 4

| | Mechanical stability (score) |
|---|---|
| Ex. 4 | 4 |
| Ex. 6 | 4 |
| Ex. 7 | 2 |

INDUSTRIAL APPLICABILITY

The release agent composition of the present invention is useful as a release agent for e.g. paper, nonwoven fabrics, leather products, stone materials, or concrete building materials.

This application is a continuation of PCT Application No. PCT/JP2011/052779, filed on Feb. 9, 2011, which is based upon and claims the benefit of priority from Japanese Patent Application No. 2010-030189 filed on Feb. 15, 2010. The contents of those applications are incorporated herein by reference in its entirety.

What is claimed is:

1. A release agent composition comprising a fluorocopolymer comprising structural units based on monomer (a), structural units based on monomer (b), and structural units based on monomer (c), and a medium,
wherein the mass ratio of the structural units based on the monomer (a) to the structural units based on the monomer (b) (the structural units based on the monomer (a)/ the structural units based on the monomer (b)) is from 1/2 to 1/5:

monomer (a): a compound represented by formula (1):

$$(Z-Y)_n X \qquad (1)$$

wherein Z is a $C_{1-6}$ polyfluoroalkyl group or a group represented by formula (2), Y is a bivalent organic group or a single bond, n is 1 or 2, and X is any one of groups represented by formulae (3-1) to (3-5) when n is 1, and is any one of groups represented by formulae (4-1) to (4-4) when n is 2:

$$C_m F_{2m+1} O(CF_2 CF(CF_3)O)_d CF(CF_3)- \qquad (2)$$

wherein m is an integer of from 1 to 6, and d is an integer of from 1 to 4;

$$-C(R)=CH_2 \qquad (3\text{-}1),$$

$$-C(O)OC(R)=CH_2 \qquad (3\text{-}2),$$

$$-OC(O)C(R)=CH_2 \qquad (3\text{-}3),$$

$$-OCH_2\text{-}\phi\text{-}C(R)=CH_2 \qquad (3\text{-}4),$$

$$-OCH=CH_2 \qquad (3\text{-}5)$$

wherein R is a hydrogen atom, a methyl group or a halogen atom, and $\phi$ is a phenylene group;

$$-CH[-(CH_2)_p C(R)=CH_2]- \qquad (4\text{-}1),$$

$$-CH[-(CH_2)_p C(O)OC(R)=CH_2]- \qquad (4\text{-}2),$$

$$-CH[-(CH_2)_p OC(O)C(R)=CH_2]- \qquad (4\text{-}3),$$

$$-OC(O)CH=CHC(O)O- \qquad (4\text{-}4)$$

wherein R is a hydrogen atom, a methyl group or a halogen atom, and p is an integer of from 0 to 4;

monomer (b): a (meth)acrylate having no polyfluoroalkyl group and having a $C_{18-30}$ alkyl group; and monomer (c): a halogenated olefin.

2. The release agent composition according to claim 1, wherein the fluorocopolymer further comprises structural units based on monomer (d):

monomer (d): a monomer having no polyfluoroalkyl group and having a crosslinkable functional group.

3. The release agent composition according to claim 1, which further comprises a nonionic surfactant and a cationic surfactant.

4. The release agent composition according to claim 1, wherein the medium is at least one aqueous medium selected from the group consisting of water, an alcohol, a glycol, a glycol ether and a glycol ester.

5. The release agent composition according to claim 1, wherein the fluorocopolymer is dispersed as particles in the medium, and the average particle size of the fluorocopolymer is from 10 to 1,000 nm.

6. The release agent composition according to claim 1, wherein, in monomer (a), Z is a $C_{4-6}$ polyfluoroalkyl group.

7. The release agent composition according to claim 1, wherein monomer (a) is $C_6 F_{13} C_2 H_4 OC(O)C(CH_3)=CH_2$.

8. The release agent composition according to claim 1, wherein monomer (b) is at least one of stearyl(meth)acrylate and behenyl(meth)acrylate.

9. The release agent composition according to claim 1, wherein monomer (b) is a mixture of behenyl(meth)acrylate and at least one other (meth)acrylate, where behenyl(meth)acrylate is present in the mixture in an amount of at least 5 mass % based on the entire monomer (b).

10. The release agent composition according to claim 1, wherein monomer (c) is at least one member selected from the group consisting of vinyl chloride, vinylidene chloride, tetrafluoroethylene, and vinylidene fluoride.

11. The release agent composition according to claim 1, wherein monomer (c) is vinyl chloride or vinylidene chloride.

12. An article comprising the release agent composition according to claim 1, wherein the article has a peel strength of 0.1 to 0.6N.

13. An article according to claim 12, wherein the article has a peel strength of 0.15 to 0.5N.

14. A process for producing a release agent composition, which comprises copolymerizing a monomer mixture containing following monomer (a), monomer (b), and monomer (c) in a mass ratio of the monomer (a) to the monomer (b) (the monomer (a)/the monomer (b)) of from 1/2 to 1/5 in the presence of a polymerization initiator:

monomer (a): a compound represented by formula (1):

$$(Z-Y)_n X \qquad (1)$$

wherein Z is a $C_{1-6}$ polyfluoroalkyl group or a group represented by formula (2), Y is a bivalent organic group or a single bond, n is 1 or 2, and X is any one of groups represented by formulae (3-1) to (3-5) when n is 1, and is any one of groups represented by the formulae (4-1) to (4-4) when n is 2:

$$C_m F_{2m+1} O(CF_2 CF(CF_3)O)_d CF(CF_3)- \qquad (2)$$

wherein m is an integer of from 1 to 6, and d is an integer of from 1 to 4;

$$-C(R)=CH_2 \qquad (3\text{-}1),$$

$$-C(O)OC(R)=CH_2 \qquad (3\text{-}2),$$

$$-OC(O)C(R)=CH_2 \qquad (3\text{-}3),$$

$$-OCH_2\text{-}\phi\text{-}C(R)=CH_2 \qquad (3\text{-}4),$$

$$-OCH=CH_2 \qquad (3\text{-}5)$$

wherein R is a hydrogen atom, a methyl group or a halogen atom, and $\phi$ is a phenylene group;

$$-CH[-(CH_2)_p C(R)=CH_2]- \qquad (4\text{-}1),$$

$$-CH[-(CH_2)_p C(O)OC(R)=CH_2]- \qquad (4\text{-}2),$$

$$-CH[-(CH_2)_p OC(O)C(R)=CH_2]- \qquad (4\text{-}3),$$

$$-OC(O)CH=CHC(O)O- \qquad (4\text{-}4)$$

wherein R is a hydrogen atom, a methyl group or a halogen atom, and p is an integer of from 0 to 4;

monomer (b): a (meth)acrylate having no polyfluoroalkyl group and having a $C_{18-30}$ alkyl group; and monomer (c): a halogenated olefin.

* * * * *